W. LOUGHRIDGE.
INGRESS VALVE.

No. 187,022.  Patented Feb. 6, 1877.

WITNESSES.
Geo. H. Carman
C. E. Lewis

INVENTOR.
William Loughridge.

UNITED STATES PATENT OFFICE.

WILLIAM LOUGHRIDGE, OF BALTIMORE, MARYLAND.

IMPROVEMENT IN INGRESS-VALVES.

Specification forming part of Letters Patent No. 187,022, dated February 6, 1877; application filed July 19, 1876.

*To all whom it may concern:*

Be it known that I, WILLIAM LOUGHRIDGE, of the city of Baltimore and State of Maryland, have invented a new and useful Improvement in Ingress-Valves common to Air or Vacuum Pumps, which improvement is fully set forth in the following specification, reference being had to the accompanying drawings.

Figure 3:
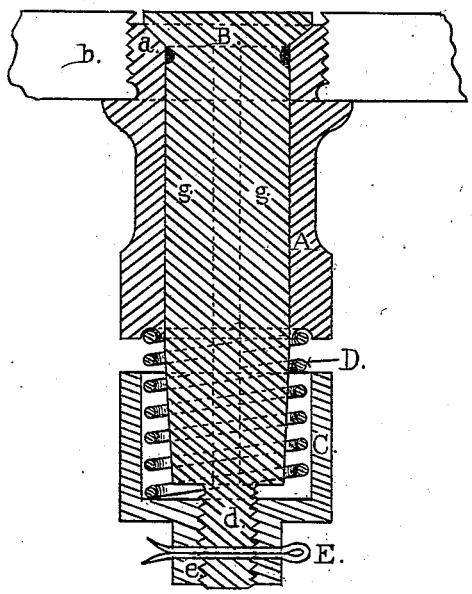
Figure 1:
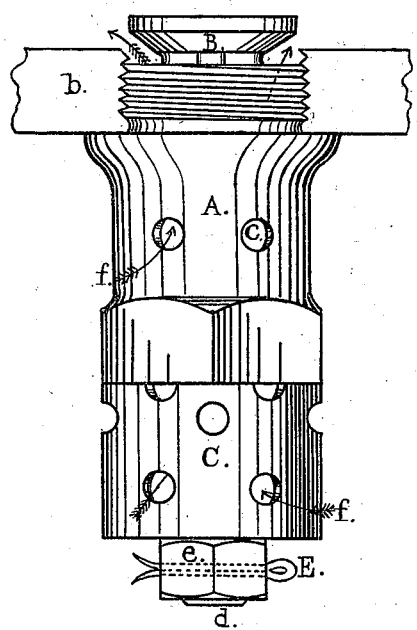
Figure 4:
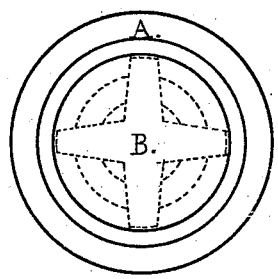
Figure 2:
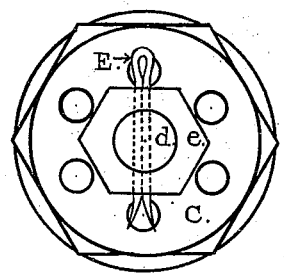

Figure 1 is a side elevation of my improved valve screwed into a section of the pump's cylinder, with the valve open. Fig. 2 is an end view of the same, showing the cup. Fig. 3 is a half-sectional view also attached to the pump's cylinder with the valve closed. Fig. 4 is an end view of the same, showing the end of the valve.

Like letters refer to like parts in each.

The parts composing the improvement consist of a cylinder, A, valve B, cup C, spring D, and split key E. A has its shell perforated with a series of holes, c, to admit air into the pump-cylinder b, as shown by the arrows f f. I provide a seat in one end for the valve B, and screw-threads on the same end to screw into the pump-cylinder b; or it may be screwed into the piston-head, if desired. C is a cup, also perforated like A, having a threaded nut, e, in its bottom to screw upon the stem d. The function of this cup is to regulate the stroke of the valve, and the space between the ends of A and the cup must equal the required stroke or movement of the valve. It also prevents the valve from being drawn into the pump's cylinder after the spring weakens or is broken. D is a coiled spring that fulcrates and rests within one end against the bottom of the cup C, and at the other end against the end of A. Its functions are to keep the valve closed until the piston of the pump recedes from it, when it will yield to the atmospheric pressure and allow the valve to open and admit air to replenish the pump. E is a split key that passes through the nut e and valve-stem d, to prevent the cup from turning. A lock-nut may be substituted for it.

When detailed parts A, B, C, D, and E are completed, first drop the valve B into its seat in A, then slip the spring D over the wings g g of the valve, then screw the cup C upon the valve-stem d, being careful to regulate the distance between the ends of the cup C and A equal to the required stroke of the valve; then fasten with the key E or lock-nut, (which are not shown;) then screw A into the pump-cylinder b, of which a section is shown, when the improvement will be ready to work.

By an inversion of the valve it may be adapted to a vacuum-pump.

Having described its construction and operation, I claim as new and of my invention—

1. The herein-described valve, consisting of the cylinder A, valve B, cup C, and spring D, arranged in relation to each other and the pump-cylinder b, substantially as and for the purposes specified.

2. The cup C, spring D, valve B, wings g g, and valve-stem d, arranged in relation to each other and to the cylinder A, substantially as and for the purposes specified.

WM. LOUGHRIDGE.

Witnesses:
GEO. H. CARMAN,
C. E. LEWIS.